Inventor
V. H. JOCKISCH
By Watson E. Coleman
Attorney

UNITED STATES PATENT OFFICE.

VELMER H. JOCKISCH, OF GREENSBORO, ALABAMA.

PEANUT-DIGGER.

1,228,562.　　　　Specification of Letters Patent.　　Patented June 5, 1917.

Application filed July 24, 1916. Serial No. 111,061.

*To all whom it may concern:*

Be it known that I, VELMER H. JOCKISCH, a citizen of the United States, residing at Greensboro, in the county of Hale and State of Alabama, have invented certain new and useful Improvements in Peanut-Diggers, of which the following is a specification, reference being had to the accompanying drawings.

This invention relates to certain improvements in peanut diggers and it is an object of the invention to provide a novel and improved device of this general character wherein the plow or digging implement passes under the peanuts and cuts off the tap roots.

It is also an object of the invention to provide a device of this general character with novel and improved means whereby the vines may be loosened from the ground and caused to pass over the plow or digging implement whereby the possibility of choking is eliminated.

A still further object of the invention is to provide a novel and improved peanut digger which leaves the soil or ground in good condition as the plow or digging implement passes under the vines, which grow near the surface, and does not form ridges or furrows.

The invention consists in the details of construction and in the combination and arrangement of the several parts of my improved peanut digger whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1:
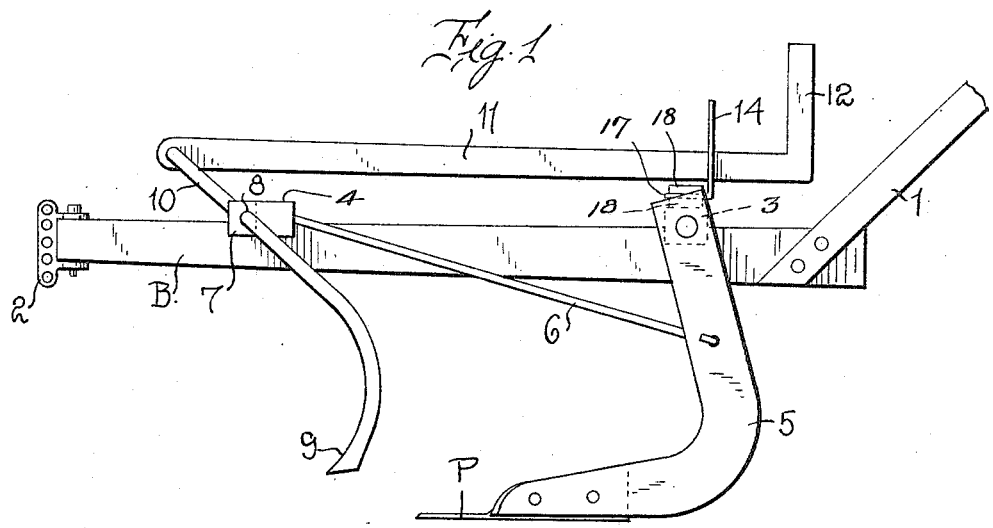
Figure 1 is a view in side elevation of a peanut digger constructed in accordance with an embodiment of my invention; the handle being shown in fragment.
Figure 2:
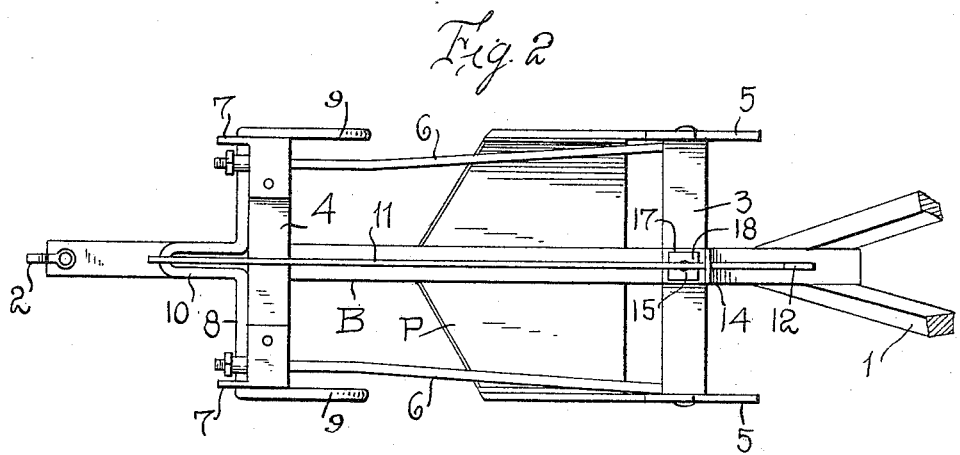
Fig. 2 is a view in top plan of the device as disclosed in Fig. 1.
Figure 3:
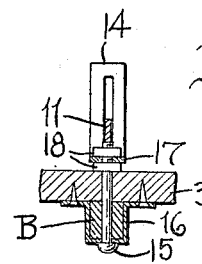
Fig. 3 is a fragmentary view partly in section and partly in elevation illustrating certain features of the invention as herein embodied.

As disclosed in the accompanying drawings, B denotes a beam of predetermined dimensions and provided at its rear end with the handles 1 and at its forward end with a hitch 2 for purposes which are believed to be self-evident.

The beam B is provided with the longitudinally spaced cross beams 3 and 4 extending beyond opposite sides thereof. Pivoted to the outer ends of the rear cross beam 3 are the depending shanks 5 substantially L-shaped in form and affixed between the extremities of the feet of said shanks 5 is the plow or digging implement P herein disclosed as flat and having its cutting or entering edge substantially V-shaped in form with the apex thereof forwardly disposed.

Pivotally engaged with the stems of the shanks 5 are the rear ends of the brace rods 6 which are also disposed through the opposite end portions of the forward cross beam 4. The braces 6 are capable of longitudinal adjustment so that the plow or digging implement P may be set to cut deep or shallow in accordance with the necessities of practice.

The opposite ends of the front beam 4 are provided with the forwardly directed brackets 7 which rotatably support the rock shaft 8, the extremities of which are disposed downwardly on a predetermined rearward incline to afford engaging members 9 to travel along opposite sides of a row and to impinge upon the ground or soil sufficiently so that the vines may be loosened therefrom and thrown toward the center of the row so that said vines will freely pass over the plow or digging implement P, whereby it will be perceived that the possibility of choking the digger is eliminated.

The intermediate portion of the rock shaft 8 is provided with a rock arm 10 with which is operatively engaged the elongated member 11 which is disposed longitudinally of the beam B and terminates in the upstanding operating member or hand grasp 12 whereby the requisite endwise movement may be imparted thereto for controlling the positioning of the members or arms 9. The rear cross member 3 is provided with the upstanding loop 14 through which the elongated member 11 is directed whereby said member is guided in its movement.

In the present embodiment of my invention the rear cross member 3 is secured to the beam B through the medium of the bolt 15 together with the strap 16. The extremities of the strap 16 are secured to the under surface of the beam 3 and straddle the under portion of the beam B and said strap has disposed therethrough the bolt 15 hereinbefore referred to. The upper end portion of the bolt 15 also serves as a mounting for the loop or guide 14, the lower portion of which is angularly disposed, as at 17, and through which the bolt 15 is directed. The upper extremity of the bolt 15 has engaged therewith the clamping nuts 18 between which the angular portion 17 of the guide member or loop 14 is positioned.

In operation, the plow or digging implement P is so adjusted as to penetrate the ground or soil sufficiently to pass under the peanuts, which grow near the surface, and as the device is drawn forwardly, the tap roots are severed. This results in the preservation of the soil as the same does not lose the nitrogen contained within the root. It will also be perceived that by having the plow or digging implement P flat it leaves the ground or soil in good condition as it does not cut a ridge or furrow as is the case with plows of conventional construction.

From the foregoing description, it is thought to be obvious that a peanut digger constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A peanut digger comprising a beam, a cross beam secured thereto and extending beyond opposite sides thereof, substantially L-shaped shanks having the upper end portions of their stems pivotally engaged with the ends of the beam, a flat digging element supported by the forward end portions of the feet of said shanks, and means for holding the shanks against pivotal movement.

2. A peanut digger comprising a beam, a cross beam secured thereto and extending beyond opposite sides thereof, substantially L-shaped shanks having the upper end portions of their stems pivotally engaged with the ends of the beam, a flat digging element supported by the forward end portions of the feet of said shanks, a second cross beam carried by the first named beam at a predetermined point in advance of the first named cross beam, and braces secured to the stems of the shanks and disposed through the end portions of the second cross beam for holding said shanks against pivotal movement.

In testimony whereof I hereunto affix my signature in the presence of two witnesses.

VELMER H. JOCKISCH.

Witnesses:
 JOSEPH H. JAMES,
 WM. E. W. YERBY.

Copies of this patent may be obtained for five cents each, by addressing the "Commissioner of Patents, Washington, D. C."